United States Patent
Li et al.

(10) Patent No.: US 10,341,119 B2
(45) Date of Patent: Jul. 2, 2019

(54) APPARATUSES AND METHODS FOR TRUSTED MODULE EXECUTION

(71) Applicant: VIA Alliance Semiconductor Co., Ltd., Shanghai (CN)

(72) Inventors: Kai Li, Beijing (CN); Yun Shen, Beijing (CN); Hui Li, Beijing (CN)

(73) Assignee: VIA ALLIANCE SEMICONDUCTOR CO., LTD., Shanghai (CN)

( * ) Notice: Subject to any disclaimer, the term of this patent is extended or adjusted under 35 U.S.C. 154(b) by 167 days.

(21) Appl. No.: 15/348,252

(22) Filed: Nov. 10, 2016

(65) Prior Publication Data

US 2018/0091313 A1   Mar. 29, 2018

(30) Foreign Application Priority Data

Sep. 26, 2016  (CN) .......................... 2016 1 0851651

(51) Int. Cl.
| | | |
|---|---|---|
| G06F 9/32 | (2018.01) | |
| G06F 9/44 | (2018.01) | |
| G06F 9/06 | (2006.01) | |
| G06F 21/44 | (2013.01) | |
| G06F 21/57 | (2013.01) | |
| H04L 9/32 | (2006.01) | |
| G06F 9/4401 | (2018.01) | |
| H04L 9/06 | (2006.01) | |
| H04L 9/14 | (2006.01) | |
| H04L 9/30 | (2006.01) | |

(52) U.S. Cl.
CPC .......... *H04L 9/3263* (2013.01); *G06F 9/4403* (2013.01); *G06F 9/4406* (2013.01); *G06F 21/44* (2013.01); *G06F 21/575* (2013.01); *H04L 9/0643* (2013.01); *H04L 9/14* (2013.01); *H04L 9/30* (2013.01); *H04L 9/3242* (2013.01); *H04L 9/3247* (2013.01); *H04L 9/3268* (2013.01); *H04L 2209/38* (2013.01)

(58) Field of Classification Search
CPC .................................. G06F 9/44; G06F 21/44
See application file for complete search history.

(56) References Cited

U.S. PATENT DOCUMENTS

| | | | |
|---|---|---|---|
| 6,263,431 B1 | 7/2001 | Lovelace et al. | |
| 9,652,635 B2 * | 5/2017 | Goto | ........................ G06F 21/70 |
| 10,025,600 B2 * | 7/2018 | Ehrenberg | ............ G06F 9/4406 |
| 2003/0221114 A1 * | 11/2003 | Hino | ........................ G06F 21/31 |
| | | | 713/189 |
| 2004/0064457 A1 * | 4/2004 | Zimmer | ................ G06F 21/575 |
| 2005/0039016 A1 | 2/2005 | Aissi et al. | |

(Continued)

*Primary Examiner* — Phil K Nguyen
(74) *Attorney, Agent, or Firm* — McClure, Qualey & Rodack, LLP

(57) ABSTRACT

A computer system including a processor and a memory is provided. The processor includes a microcode executing unit and a programmable fuse which stores trusted information which is pre-generated using China commercial cryptography algorithms. The memory is operatively coupled to the processor and is configured to store a trusted module and a digital certificate of the trusted module. The microcode executing unit uses the China commercial cryptography algorithms to authenticate the digital certificate according to the trusted information, and authenticates the trusted module according to the authenticated digital certificate.

18 Claims, 8 Drawing Sheets

(56) References Cited

U.S. PATENT DOCUMENTS

| | | | |
|---|---|---|---|
| 2005/0132357 A1* | 6/2005 | Shell | G06F 21/121 |
| | | | 717/174 |
| 2006/0253702 A1* | 11/2006 | Lowell | G06F 21/33 |
| | | | 713/156 |
| 2009/0113558 A1* | 4/2009 | Prabhakaran | G06F 9/4401 |
| | | | 726/27 |
| 2009/0257595 A1* | 10/2009 | de Cesare | G06F 21/575 |
| | | | 380/277 |
| 2010/0048296 A1 | 2/2010 | Adiraju | |
| 2010/0178977 A1* | 7/2010 | Kim | G06F 21/51 |
| | | | 463/25 |
| 2011/0258426 A1* | 10/2011 | Mujtaba | G06F 21/57 |
| | | | 713/2 |
| 2012/0036372 A1* | 2/2012 | Leclercq | H04N 21/418 |
| | | | 713/192 |
| 2012/0208619 A1* | 8/2012 | Canterbury | G06F 21/572 |
| | | | 463/25 |
| 2014/0089651 A1* | 3/2014 | Yao | H04L 9/3247 |
| | | | 713/2 |
| 2017/0177872 A1* | 6/2017 | McLean | G06F 21/575 |
| 2017/0185771 A1* | 6/2017 | Sun | G06F 21/56 |

\* cited by examiner

APPARATUSES AND METHODS FOR TRUSTED MODULE EXECUTION

CROSS REFERENCE TO RELATED APPLICATIONS

This Application claims priority of China Application No. 201610851651.0, filed on Sep. 26, 2016, the entirety of which is incorporated by reference herein.

BACKGROUND OF THE APPLICATION

Field of the Application

The application relates generally to secure execution technology, and more particularly, to secure boot and trusted execution of system software using the China commercial cryptography algorithms to establish the Static Root of Trust for Measurement (SRTM) or Dynamic Root of Trust for Measurement (DRTM).

Description of the Related Art

The Intel Trusted Execution Technology (TXT) is a computer hardware technology which runs authentications on the processor level. Specifically, the Intel TXT uses the RSA or SHA-256 cryptography algorithms to establish the chain of trust for assuring the authenticity of a platform and its operating system, including secure boot and trusted execution of the operating system and/or software application.

Regarding secure boot, the Intel TXT starts by establishing the static chain of trust from the Static Root of Trust for Measurement (SRTM) to authenticate the Authenticated Code Module (ACM) of the Basic Input/Output System (BIOS).

Regarding trusted execution of the operating system and/or software application, the Intel TXT establishes the dynamic chain of trust from the Dynamic Root of Trust for Measurement (DRTM) during the execution of the operating system, thereby authenticating the SINIT ACM.

BRIEF SUMMARY OF THE APPLICATION

In one aspect of the application, a computer system is provided. The computer system comprises a processor and a memory. The processor comprises a microcode executing unit and a programmable fuse which stores trusted information which is pre-generated using China commercial cryptography algorithms. The memory is operatively coupled to the processor and is configured to store a trusted module and a digital certificate of the trusted module. The microcode executing unit uses the China commercial cryptography algorithms to authenticate the digital certificate according to the trusted information, and authenticates the trusted module according to the authenticated digital certificate.

In another aspect of the application, a method for trusted module execution, which is executed by a processor, is provided. The method comprises the steps of: retrieving from a memory a trusted module and a digital certificate of the trusted module; using China commercial cryptography algorithms to authenticate the digital certificate according to trusted information which is pre-generated using the China commercial cryptography algorithms; authenticating the trusted module according to the authenticated digital certificate; and allowing execution of a Basic Input or Output System (BIOS), an operating system, or a software application, associated with the trusted module, when the trusted module is successfully authenticated.

Other aspects and features of the application will become apparent to those with ordinary skill in the art upon review of the following descriptions of specific embodiments of the wireless communication devices and methods for propagating a data packet in a wireless mesh network.

BRIEF DESCRIPTION OF THE DRAWINGS

The application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof. The China commercial cryptography algorithms, such as SM2 and SM3, are in compliance with the specifications defined by the Office of State Cryptography Administration. It should be understood that the specifications are used to teach the spirit of the application, and the application cannot be limited thereto.

Figure 1:
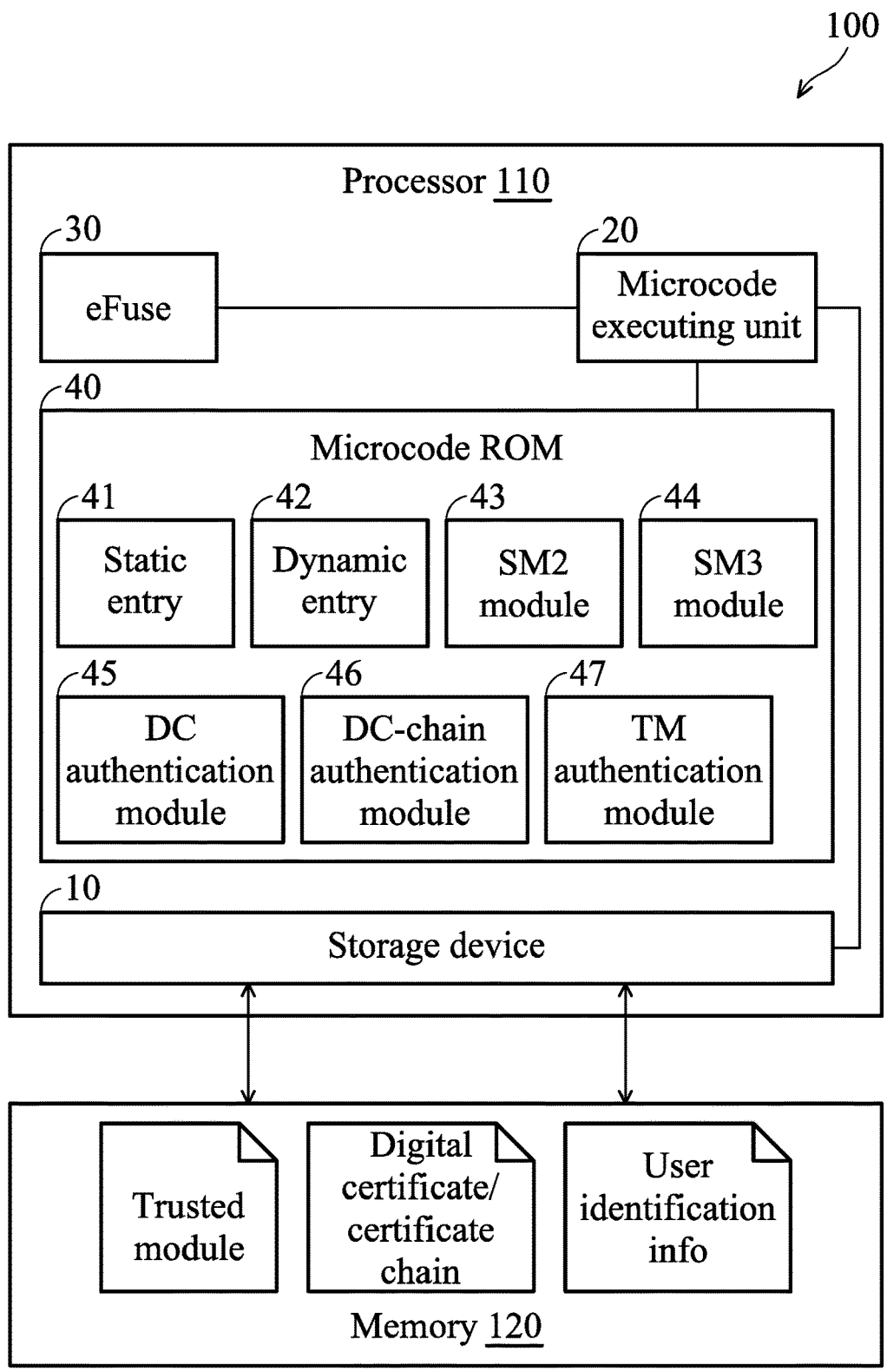
FIG. 1 is a block diagram illustrating a computer system according to an embodiment of the application.

FIG. 1 is a block diagram illustrating a computer system according to an embodiment of the application. The computer system 100 includes a processor 110 and a memory 120, wherein the memory 120 is operatively coupled to the processor 110. For example, the computer system 100 may be a desktop computer, notebook, panel Personal Computer (PC), workstation, feature phone, mobile phone, smart TV, gaming console, or any computing device.

In one embodiment, the memory 120 is a non-transitory machine-readable storage medium, such as a FLASH memory, storing a trusted module and a digital certificate or certificate chain of the trusted module. In some embodiments, the memory 120 further stores the user identification information for individual recognition. Specifically, the user identification information may include a user name or account ID, the user's gender, and/or an office department ID to which the user belongs. In other embodiments, a default user identification information may be used for authenticating the digital certificate of the trusted module if the requirement for individual recognition is not mandatory.

The authentication of the digital certificate of the trusted module will be described later with FIG. 3.

The processor 110 may be a general-purpose processor, Micro-Control Unit (MCU), Digital Signal Processor (DSP), application processor, or the like. Specifically, the processor 110 includes a storage device 10, a microcode executing unit 20, an eFuse 30, and a Microcode Read-Only Memory (ROM) 40.

The storage device 10 may be a FLASH memory or a Non-volatile Random Access Memory (NVRAM), for storing the data, such as the trusted module, the digital certificate or certificate chain of the trusted module, and/or the user identification information, which is retrieved from the memory 120.

The microcode executing unit 20 may include various circuitry for providing the function of data processing and computing, storing and/or retrieving data to and from the storage device 10 and the eFuse 30, and loading and executing the microcode stored in the Microcode ROM 40. In particular, the microcode executing unit 20 coordinates the aforementioned operations of the storage device 10, the eFuse 30, and the Microcode ROM 40 for performing the method of the present application.

As will be appreciated by persons skilled in the art, the circuitry in the microcode executing unit 20 will typically comprise transistors that are configured in such a way as to control the operation of the circuitry in accordance with the functions and operations described herein. As will be further appreciated, the specific structure or interconnections of the transistors will typically be determined by a compiler, such as a register transfer language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The eFuse 30 is a programmable fuse which is used for storing trusted information pre-generated with China commercial cryptography algorithms, such as SM2 and SM3. In the present application, the trusted information is used to establish the SRTM or DRTM for establishing the static or dynamic chain of trust. Specifically, the trusted information for establishing the SRTM or DRTM at least includes the hash value ($H_{pubk}$) of the public key of the digital certificate of the trusted module, the hash value ($H_{ENTL\_ID}$) of the user identification information, and the version number ($V_n$) of the trusted module.

The Microcode ROM 40 is used for storing software modules which consist of microcode. In this embodiment, the software modules include the static entry 41, the dynamic entry 42, the SM2 module 43, the SM3 module 44, the DC (digital certificate) authentication module 45, the DC-chain authentication module 46, and the TM (trusted module) authentication module 47.

When the processor 110 is reset (e.g., upon power-on of the computer system 100), the boot process will enter the static entry 41 to obtain the initial address of the trusted module in the memory 120 and the address of the digital certificate of the trusted module in the memory 120, and to retrieve the trusted module and its digital certificate from the memory 120 and save them to the storage device 10. It should be noted that, in one embodiment, the SRTM is used for assuring secure boot, and the trusted module refers to the trusted firmware, such as the ACM of the BIOS.

During the software (e.g., operating system and/or software application) execution, a specific instruction, such as the GETSEC instruction in the x86 systems, may trigger the processor 110 to enter a specific mode and check if the configuration (e.g., the chipset configuration) of the hardware platform on which the software is running satisfies the condition for the SRTM. If the hardware platform configuration satisfies the condition for the SRTM, the boot process enters the dynamic entry 42 to obtain the parameters, including the initial address of the trusted module in the memory 120 and the address of the digital certificate of the trusted module in the memory 120, of the specific instruction, and to read the trusted module and its digital certificate into the storage device 10. It should be noted that, in one embodiment, the DRTM is used for trusted execution of the operating system or software application, and thus, the trusted module herein refers to one of the functional blocks of the operating system or software application.

The SM2 module 43 provides the function of cryptographic processing in compliance with the GM/T-0003-2012, GM/T-0009-2012, GM/T-0010-2012, and/or GM/T-0015-2012 specifications defined by the Office of State Cryptography Administration for the China commercial cryptography algorithms.

The SM3 module 44 provides the function of cryptographic processing in compliance with the GM/T-0004-2012 specification defined by the Office of State Cryptography Administration for the China commercial cryptography algorithms. Please note that, although the embodiments described herein use the China commercial cryptography algorithms SM2 and SM3 to authenticate the trusted module and its digital certificate and certificate chain, the application cannot be limited thereto. For example, the SM2 module 43 and the SM3 module 44 may provide the function of cryptographic processing using cryptography algorithms other than SM2 and SM3.

The DC authentication module 45 provides the function of authenticating the digital certificate of the trusted module to assure the authenticity of the digital certificate. The detailed description of the authentication of the digital certificate will be given later in FIG. 3.

The DC-chain authentication module 46 provides the function of authenticating the certificate chain of the trusted module to assure the authenticity of the certificate chain. The detailed description of the authentication of the certificate chain will be given later in FIG. 5.

The TM authentication module 47 provides the function of authenticating the trusted module to assure the authenticity of the trusted module. The detailed description of the authentication of the trusted module will be given later in FIG. 6.

It should be understood that the components described in the embodiment of FIG. 1 are for illustrative purposes only and are not intended to limit the scope of the application. For example, the computer system 100 may further include a display device (e.g., a Liquid-Crystal Display (LCD), Light-Emitting Diode (LED), or Electronic Paper Display (EPD)), a wired or wireless communication device, a power supply, and/or an Input/Output device (e.g., one or more buttons, a keyboard, a mouse, a touch pad, a video camera, a microphone, and/or a speaker, etc.).

Figure 2A:
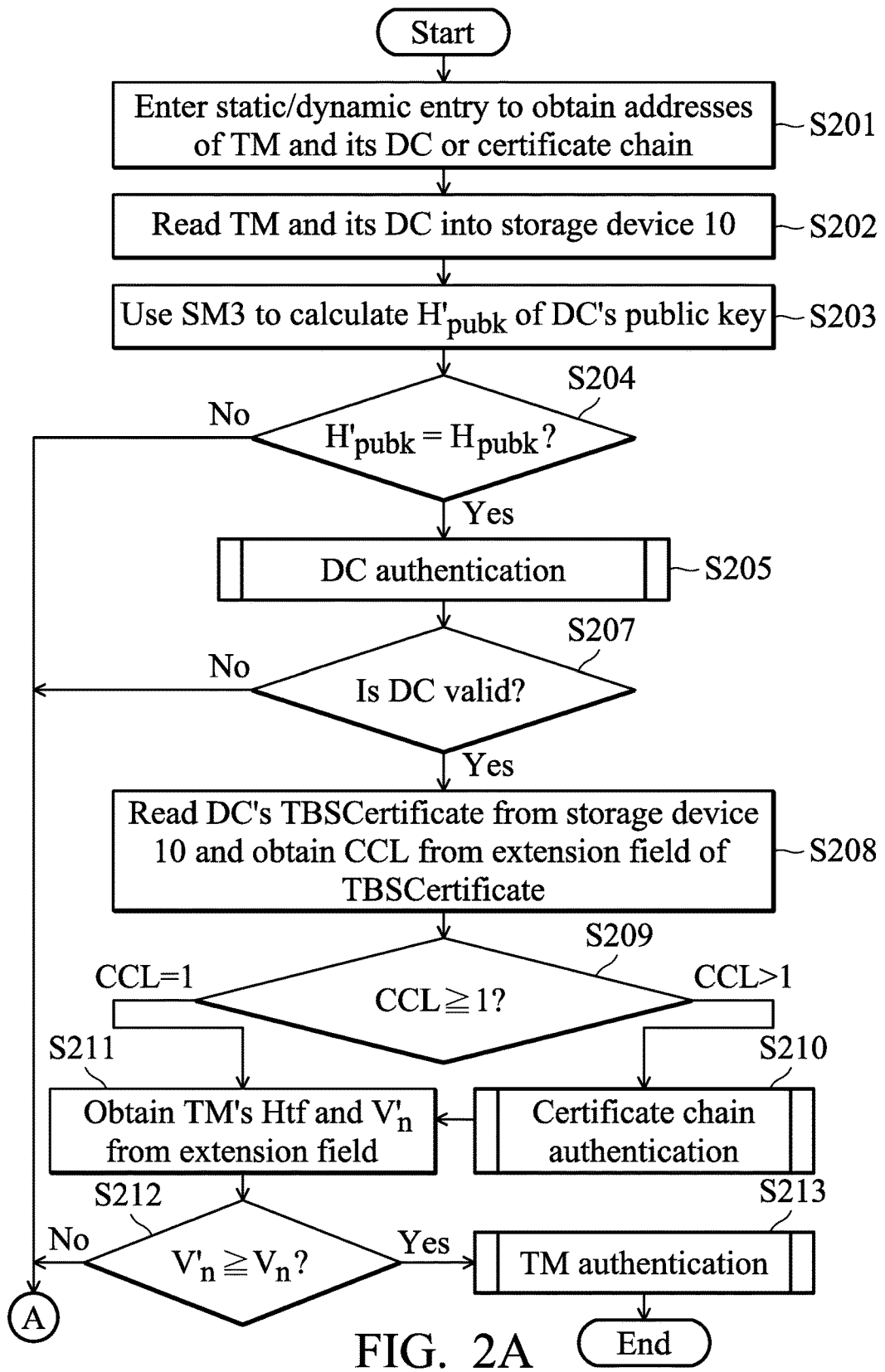
FIGS. 2A and 2B show a flow chart of the method for trusted module execution according to an embodiment of the application.
Figure 2B:
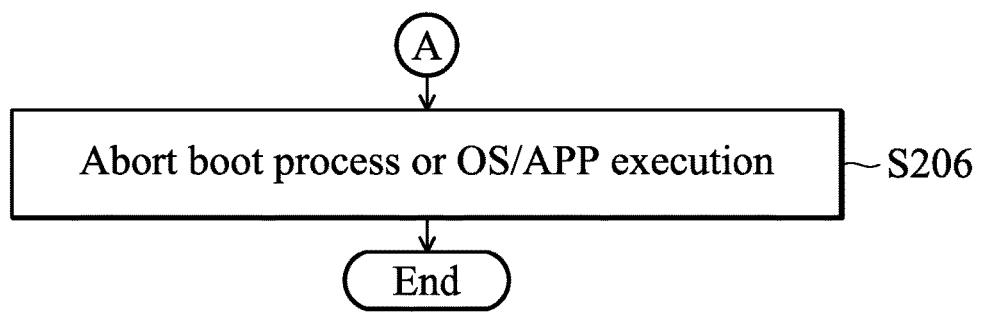

FIGS. 2A and 2B show a flow chart of the method for trusted module execution according to an embodiment of the application. To being, the microcode executing unit 20 enters the static entry for secure boot upon power-on of the computer system, or enters the dynamic entry for trusted execution of the operating system or software application during the execution of the operating system or software application. Through the static/dynamic entry, the microcode executing unit 20 obtains the initial address of the trusted module in the memory 120 and the address of the digital certificate or certificate chain of the trusted module in the memory 120 (step S201). Next, the microcode executing unit 20 reads the trusted module and its digital certificate into the storage device 10 (step S202). It should be noted that the term "trusted module" refers to a trusted firmware (e.g., the BIOS ACM) in the case of secure boot, or refers to a functional block (e.g., one of the functional blocks of an operating system or software application) in the case of trusted execution of the operating system or software application.

To further clarify, if the memory 120 stores a certificate chain, the microcode executing unit 20 only reads the root certificate of the certificate chain in to the storage device 10 in step S202.

Next, the microcode executing unit 20 uses the China commercial cryptography algorithm SM3 to calculate the hash value ($H'_{pubk}$) of the public key of the digital certificate (step S203), and compares the calculated hash value ($H'_{pubk}$) with the hash value ($H_{pubk}$) stored in the eFuse 30 (step S204). If the calculated hash value ($H'_{pubk}$) is equal to the stored hash value ($H_{pubk}$), the public key is determined to be valid, and the method proceeds to the authentication of the digital certificate (step S205). The detailed description of the authentication of the digital certificate will be given later in FIG. 3. Otherwise, if the calculated hash value ($H'_{pubk}$) is not equal to the stored hash value ($H_{pubk}$), the public key is determined to be invalid, and the boot process of the computer system (i.e., the BIOS execution) or the execution of the operating system or software application is aborted (step S206).

After the authentication of the digital certificate, the microcode executing unit 20 determines whether the authentication result indicates that the digital certificate is valid (step S207), and if so, reads the body (i.e., TBSCertificate) of the digital certificate from the storage device 10 and obtains the Certificate Chain Length (CCL) of the digital certificate from the extension field of the body (step S208). Otherwise, if the authentication result indicates that the digital certificate is invalid, the method proceeds to step S206.

Subsequent to step S208, the microcode executing unit 20 determines whether the CCL is equal to or greater than 1 (step S209). If the CCL is greater than 1, the microcode executing unit 20 performs authentication of the certificate chain (step S210). Specifically, during the authentication of the certificate chain, the digital certificates in the certificate chain are authenticated one by one from the root Certificate to the leaf Certificate. The detailed description of the authentication of the certificate chain will be given later in FIG. 5. Otherwise, if the CCL is equal to 1, the microcode executing unit 20 reads the extension field of the digital certificate and obtains the hash value ($H_{tf}$) and version number ($V'_n$) of the trusted module from the extension field (step 211).

After that, the microcode executing unit 20 compares the version number ($V'_n$) with the version number ($V_n$) stored in the eFuse 30 (step S212). If the version number ($V'_n$) is lower than the version number ($V_n$), it means that the version of the trusted module is outdated and the method proceeds to step S206. Otherwise, if the version number ($V'_n$) is greater than or equal to the version number ($V_n$), it means that the version of the trusted module is up to date and the microcode executing unit 20 performs authentication of the trusted module (step S213), and the method ends. The detailed description of the authentication of the trusted module will be given later in FIG. 6.

Figure 3:
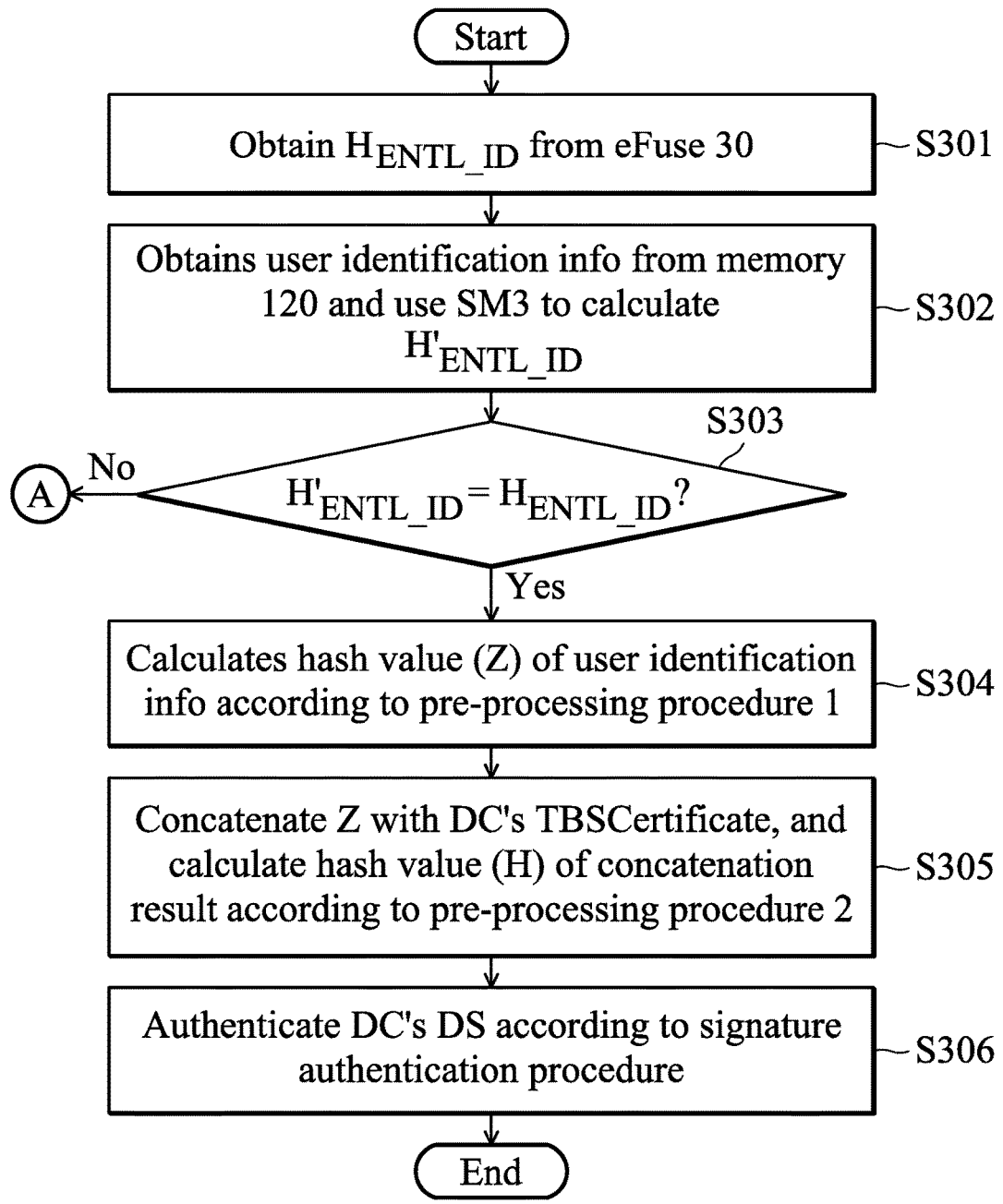
FIG. 3 is a flow chart illustrating the authentication of the digital certificate according to an embodiment of the application.

FIG. 3 is a flow chart illustrating the authentication of the digital certificate according to an embodiment of the application. To begin, the microcode executing unit 20 obtains the hash value ($H_{ENTL\_ID}$) from the eFuse 30 (step S301). Next, the microcode executing unit 20 obtains the user identification information from the memory 120 and uses the China commercial cryptography algorithm SM3 to calculate the hash value ($H'_{ENTL\_ID}$) of the user identification information and stores the hash value ($H'_{ENTL\_ID}$) in the storage device 10 (step S302).

Subsequently, the microcode executing unit 20 compares the hash value ($H'_{ENTL\_ID}$) with the hash value ($H_{ENTL\_ID}$) (step S303), and continues to authenticate the digital certificate only if the hash value ($H'_{ENTL\_ID}$) is equal to the hash value ($H_{ENTL\_ID}$). Otherwise, if the hash value ($H'_{ENTL\_ID}$) is not equal to the hash value ($H_{ENTL\_ID}$), the process proceeds to step S206.

Subsequent to step S303, if the hash value ($H'_{ENTL\_ID}$) is equal to the hash value ($H_{ENTL\_ID}$), the microcode executing unit 20 calculates the hash value (Z) of the user identification information according to the pre-processing procedure 1 (step S304). In one embodiment, the pre-processing procedure 1 may conform to one of the pre-processing procedures for the China commercial cryptography algorithm SM2, which is defined in the GM/T-0009-2012 specification. Next, the microcode executing unit 20 concatenates the hash value (Z) with the body (i.e., TBSCertificate) of the digital certificate, and calculates the hash value (H) of the concatenation result according to the pre-processing procedure 2 (step S305). In one embodiment, the pre-processing procedure 2 may conform to one of the pre-processing procedures for the China commercial cryptography algorithm SM2, which is defined in the GM/T-0009-2012 specification.

After that, the microcode executing unit 20 authenticates the digital signature of the digital certificate according to the signature authentication procedure for the China commercial cryptography algorithm SM2 (step S306), and the authentication of the digital certificate ends. In one embodiment, the signature authentication procedure may be the signature authentication procedure defined in the GM/T-0003-2012 specification for the China commercial cryptography algorithm SM2. It is determined that the digital certificate is valid if the digital signature is successfully authenticated. Otherwise, if the digital signature fails the authentication, it is determined that the digital certificate is invalid.

It should be noted that, in the cases where the requirement for individual recognition is not mandatory, a default user identification information may be used instead to calculate the hash value (Z) in step S304, and the hash value (Z) calculated with the default user identification information may be used to calculate the hash value (H) in step S305. In such cases, the memory 120 is not required to store the user identification information, and steps S301 to S303 may be skipped since there's no stored user identification information in the memory 120.

Figure 4:
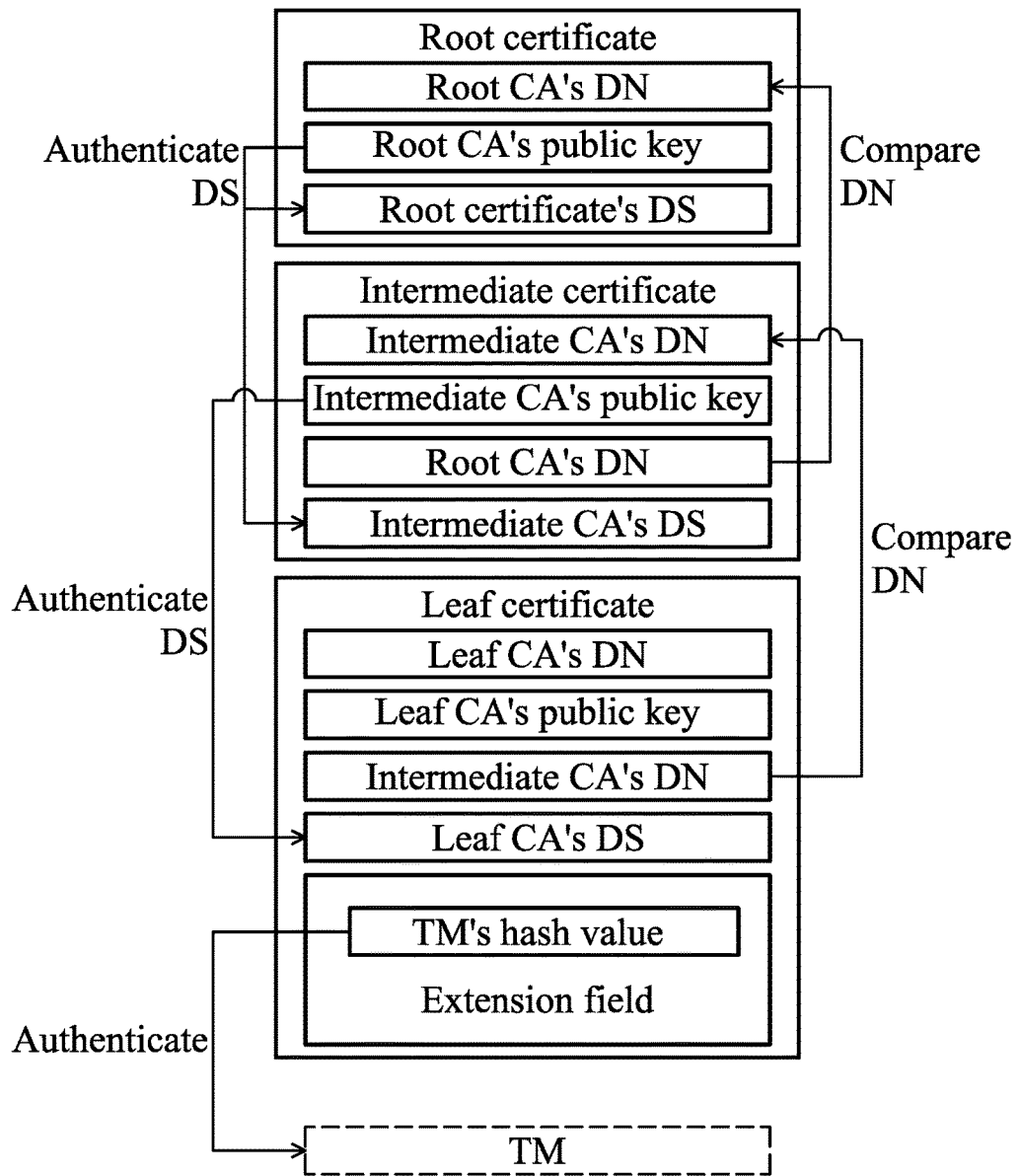
FIG. 4 is a block diagram illustrating a certificate chain according to an embodiment of the application.

FIG. 4 is a block diagram illustrating a certificate chain according to an embodiment of the application. In this embodiment, a level 3 chained certificate is shown as an example, wherein every certificate conforms to the same format, for example, in compliance with to the GM/T-0015-2012 specification, such as a self-signed X509 V3 certificate.

As shown in FIG. 4, the root certificate includes at least the Distinguished Name (DN) and the public key of the root Certificate Authority (CA), and the digital signature of the root certificate. The intermediate Certificate includes at least the DN and the public key of the intermediate CA, the DN of the root CA, and the digital signature of the intermediate certificate. The leaf certificate includes at least the DN and the public key of the leaf CA, the DN of the intermediate CA, the digital signature of the leaf certificate, and the extension field of the leaf certificate, wherein the extension field of the leaf certificate includes the hash value of the trusted module.

It should be understood that there is a specific authentication order between the three digital certificates in the certificate chain. That is, the intermediate certificate is authenticated by the root certificate, the leaf certificate is authenticated by the intermediate certificate, and the trusted module is authenticated by the leaf certificate. In addition, with respect to the DN of each certificate, the root certificate is referred back to by the intermediate certificate, and the intermediate certificate is referred back to by the leaf certificate.

To further clarify, at first, the digital signature of the root certificate is authenticated using the public key of the root certificate (i.e., step S205 in FIG. 2) (please refer to FIG. 3 for the detailed description of digital certificate authentication). If the root certificate is successfully authenticated (i.e., the 'Yes' branch of step S207) and the DNs of the root certificate contained in the root and intermediate certificates match with each other, the microcode executing unit 20 uses the public key of the root certificate to authenticate the digital signature of the intermediate certificate (please refer to FIG. 3 for the detailed description of digital certificate authentication). Similarly, if the intermediate certificate is successfully authenticated and the DNs of the intermediate certificate contained in the intermediate and leaf certificates match with each other, the microcode executing unit 20 uses the public key of the intermediate certificate to authenticate the digital signature of the leaf certificate (please refer to FIG. 3 for the detailed description of digital certificate authentication). That is, for each certificate in the chain, the public key therein is used to authenticate the digital signature in the next certificate in the chain, and the DN therein is used to refer back to the previous certificate in the chain. Please note that, in the entire chain, only the extension field of the leaf certificate includes the parameters that are newly introduced in the application. Specifically, in addition to the hash value of the trusted module, the parameters further include the type of the trusted module, the CCL, and the version number of the trusted module, etc., which may be used for authentication of the trusted module. The detailed description of the authentication of the trusted module will be given later in FIG. 6.

For those skilled in the art, it should be understood that the digital certificate may conform to a format other than X509, or any self-defined format, and the application cannot be limited thereto.

Figure 5:
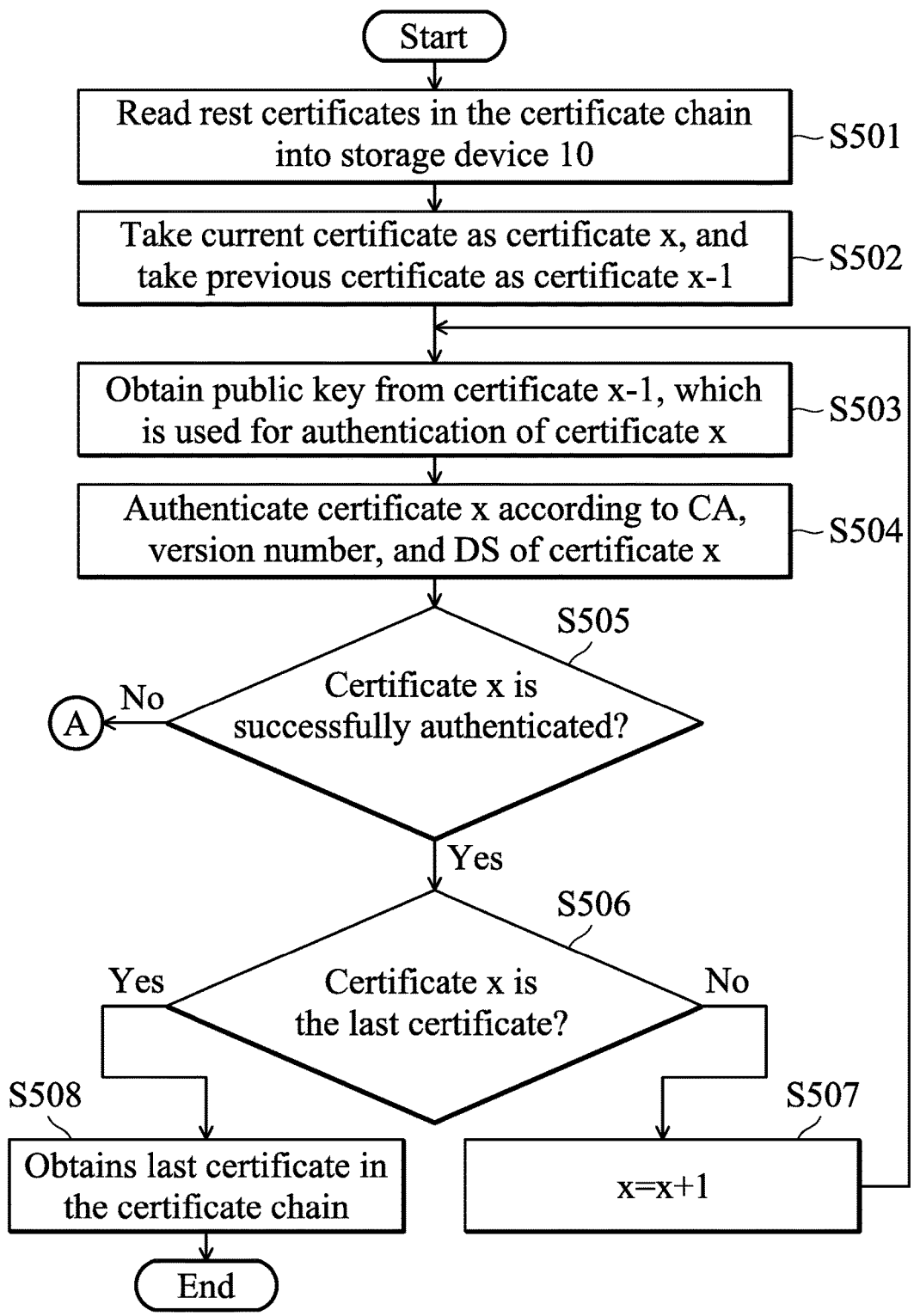
FIG. 5 is a flow chart illustrating the authentication of the certificate chain according to an embodiment of the application.

FIG. 5 is a flow chart illustrating the authentication of the certificate chain according to an embodiment of the application. Since the root certificate has been retrieved in step S202, the flow chart starts by the microcode executing unit 20 reading the rest of the certificates in the certificate chain into the storage device 10 (step S501). The microcode executing unit 20 takes the current certificate, e.g., the intermediate certificate in FIG. 4, as certificate x, and takes the previous certificate, e.g., the root certificate in FIG. 4, as certificate x-1 (step S502).

Next, the microcode executing unit 20 obtains the public key from certificate x-1, which is used for authentication of certificate x (step S503), and then authenticates certificate x according to the CA, version number, and digital signature of certificate x (step S504). Specifically, the microcode executing unit 20 first determines whether the DNs of the CAs of certificates x and x-1 are the same, and then authenticates the digital signature of certificate x according to steps S304~306 in FIG. 3.

Based on the authentication result of step S504, the microcode executing unit 20 determines whether certificate x is successfully authenticated (step S505), and if not, the process proceeds to step S206. Otherwise, if certificate x is successfully authenticated, the microcode executing unit 20 determines whether certificate x is the last certificate in the certificate chain (step S506).

Subsequent to step S506, if certificate x is not the last certificate in the certificate chain, x is increased by 1 (step S507), and the process returns to step S503 to continue authenticating the next certificate.

Subsequent to step S506, if certificate x is the last certificate in the certificate chain, the microcode executing unit 20 obtains the last certificate, e.g., the leaf certificate in FIG. 4 (step S508), and the process ends.

Figure 6:
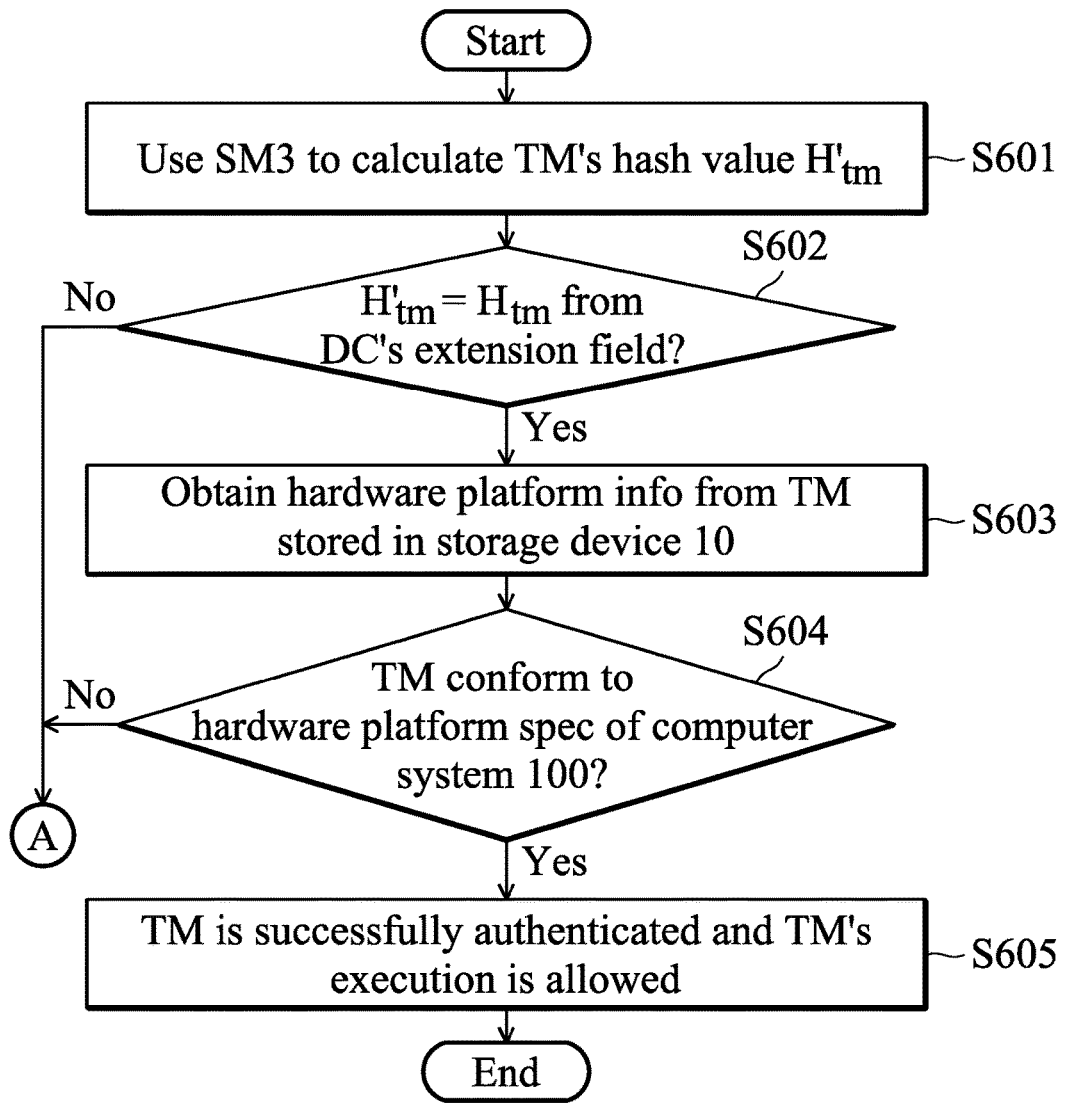
FIG. 6 is a flow chart illustrating the authentication of the trusted module according to an embodiment of the application.

FIG. 6 is a flow chart illustrating the authentication of the trusted module according to an embodiment of the application. To begin, the microcode executing unit 20 uses the China commercial cryptography algorithm SM3 to calculate the hash value ($H'_{tm}$) of the trusted module stored in the storage device 10 (step S601), and compares the hash value ($H'_{tm}$) with the hash value ($H_{tm}$) obtained from the extension field of the digital certificate (step S602).

If the comparison result indicates that the two hash values are equal to each other, the microcode executing unit 20 obtains the hardware platform information from the trusted module stored in the storage device 10 (step S603), and then determines whether the trusted module conforms to the hardware platform specification of the computer system 100 according to the hardware platform information (step S604). Specifically, the trusted module includes not only program code to be executed, but also hardware platform information, so that the microcode executing unit 20 may verify if the trusted module conforms to the hardware platform specification of the computer system 100 according to the hardware platform information. The hardware platform information includes a list of compatible chipsets and version number(s), etc.

Subsequent to step S604, if the trusted module conforms to the hardware platform specification, it means that the trusted module is successfully authenticated and the microcode executing unit 20 allows the execution of the trusted module (step S605). In other words, the execution of secure boot (i.e., the BIOS execution), or operating system, or software application is allowed. Otherwise, if the trusted module does not conform to the hardware platform specification, the process proceeds to step S206.

Figure 7:
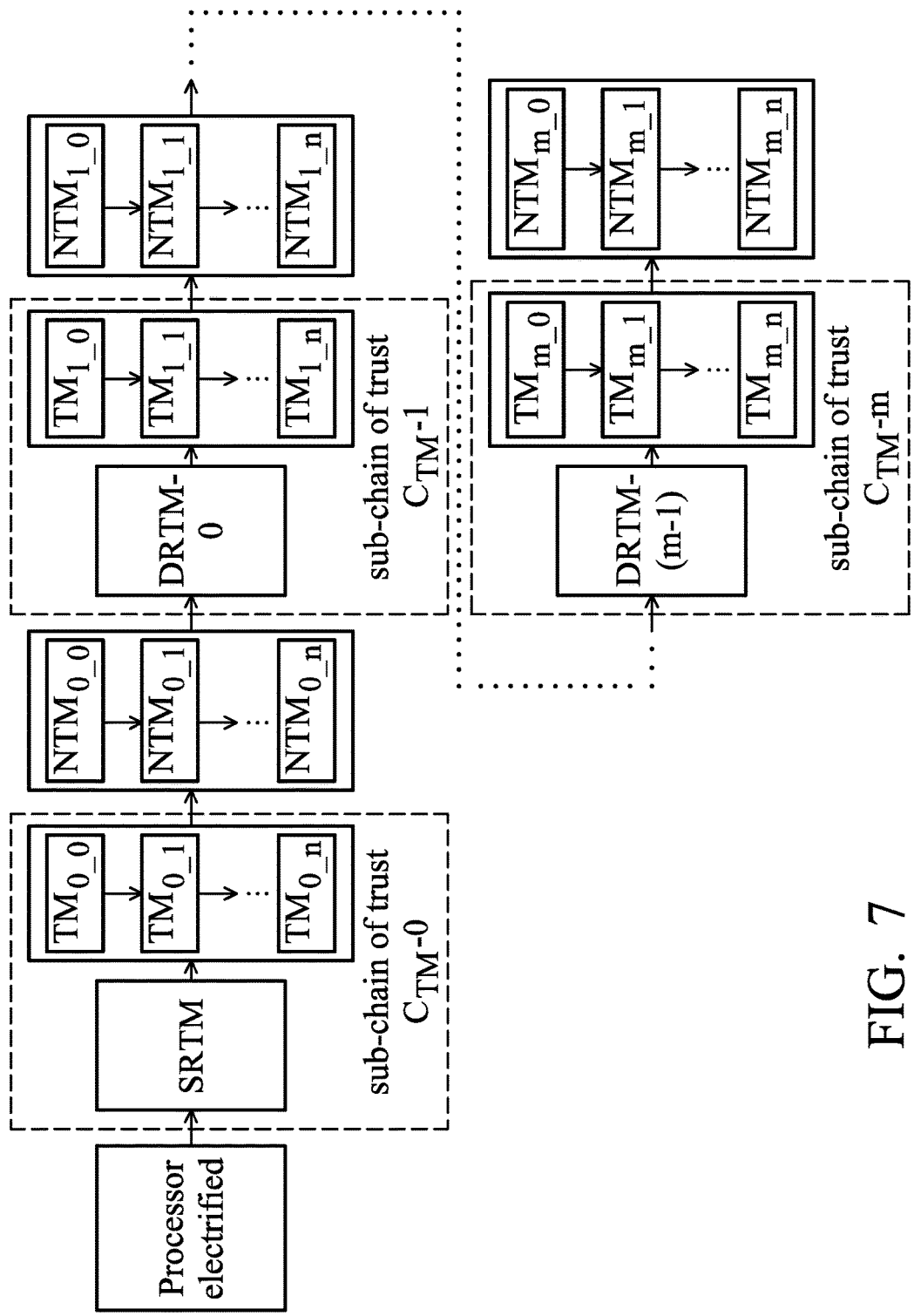
FIG. 7 is a block diagram illustrating a chain of trust established using the China commercial cryptography algorithms according to an embodiment of the application.

FIG. 7 is a block diagram illustrating a chain of trust established using the China commercial cryptography algorithms according to an embodiment of the application. In order to accommodate different scenarios, there is some software/firmware in a computer system, which is required to be prevented from being modified (i.e., the software/firmware is un-modifiable), while there is some software/firmware that is allowed to be updated or modified in certain cases. For illustration purposes, the un-modifiable software/firmware may be referred to as a trusted module (denoted as TM in FIG. 7), and the modifiable software/firmware may be referred to as a non-trusted module (denoted as NTM in FIG. 7).

During the process of system boot-up or normal system operation, the trusted modules and non-trusted modules may co-exist in the form of chains, wherein the chains are correlated with one another. For a chain consisting of a plurality of trusted modules, each trusted module may be authenticated by the method for trusted module execution as illustrated in FIG. 2, thereby establishing chains of trust, including static chain of trust and dynamic chain of trust, using the China commercial cryptography algorithms.

As shown in FIG. 7, after the processor is electrified (i.e., the computer system is powered on), the authentication of the sub-chain of trust $C_{TM}$-0 is performed first. In this embodiment, the sub-chain of trust $C_{TM}$-0 is a static chain of trust, wherein the SRTM is established according the trusted information (e.g., the SRTM is established by the process in FIG. 2 from the start to the digital certificate or certificate chain being authenticated successfully), and the trusted module $TM_{0\_0}$ is authenticated according to the SRTM, and then the trusted modules $TM_{0\_1} \sim TM_{0\_n}$ are authenticated one by one with each being authenticated by the previous one. Subsequent to the authentication of the sub-chain of trust $C_{TM}$-0, the chain of non-trusted modules $C_{NTM}$-0 is executed. It should be noted that authentication for the chain of non-trusted modules $C_{NTM}$-0 is not required since the non-trusted modules have no security issues. However, the non-trusted modules are essential modules to run the computer system 100.

Subsequent to the execution of the chain of non-trusted modules $C_{NTM}$-0, the sub-chain of trust $C_{TM}$-1 is authenticated. In this embodiment, the sub-chain of trust $C_{TM}$-1 is a dynamic chain of trust, wherein the DRTM is established according the trusted information (e.g., the DRTM is established by the process in FIG. 2 from the start to the digital certificate or certificate chain being authenticated successfully), and the trusted module $TM_{1\_0}$ is authenticated according to the DRTM, and then the trusted modules $TM_{1\_1} \sim TM_{1\_a}$ are authenticated one by one with each being authenticated by the previous one. Subsequent to the authentication of the sub-chain of trust $C_{TM}$-1, the chain of non-trusted modules $C_{NTM}$-1 is executed. After that, the process continues to authenticate the sub-chains of trust $C_{TM}$-2 to $C_{TM}$-m with the executions of the chains of non-trusted modules $C_{NTM}$-2 to $C_{NTM}$-m interlaced therein. As mentioned above, multiple dynamic chains of trust may be established by a trigger instruction, such as the GETSEC instruction in the X86 systems. That is, when executing the trigger instruction, the processor may authenticate multiple trusted modules one by one in a certain order to establish a dynamic chain of trust. The trusted modules in each dynamic chain of trust are associated with a respective functional block of the operating system or software application, and the processor establishes a dynamic chain of trust for each functional block when the operating system or software application is executed.

The function of trusted storing provided by the Trusted Cryptography Module (TCM) or Trusted Platform Module (TPM) may be required during the establishment of chain of trust using the China commercial cryptography algorithms. Specifically, the function of trusted storing is able to secure the stored content using the China commercial cryptography algorithms, wherein the stored content may include the secret key used for authenticating a certain module, and the measurement result of a certain module, etc.

In view of the forgoing embodiments, it will be appreciated that the present application implements secure boot and trusted execution of system software by using the China commercial cryptography algorithms to establish the SRTM/DRTM. When compared to the Intel TXT which uses RSA or SHA-256 cryptography algorithms and only authenticates the trusted modules, the present application uses the China commercial cryptography algorithms and is able to authenticate the trusted modules and their digital certificates or certificate chains (which has a higher security level than just authenticating the digital certificates). Advantageously, the method for trusted module execution proposed in the present application may achieve a higher level of security regarding secure boot and trusted execution of system software.

While the application has been described by way of example and in terms of preferred embodiment, it should be understood that the application cannot be limited thereto. Those who are skilled in this technology can still make various alterations and modifications without departing from the scope and spirit of this application. Therefore, the scope of the present application shall be defined and protected by the following claims and their equivalents.

What is claimed is:

1. A computer system, comprising:
   a processor comprising a microcode executing unit and an efuse storing trusted information which is pre-generated using China commercial cryptography algorithms and comprises a first hash value corresponding to a public key of a digital certificate of a trusted module; and
   a memory, operatively coupled to the processor, configured to store the trusted module and the digital certificate of the trusted module;
   wherein the microcode executing unit uses the China commercial cryptography algorithms to authenticate the digital certificate according to the trusted information stored in the efuse of the processor, and authenticates the trusted module according to the authenticated digital certificate;
   wherein the microcode executing unit further calculates a second hash value for the public key, and the authentication of the digital certificate is allowed to be performed when the calculated second hash value is equal to the first hash value.

2. The computer system as claimed in claim 1, wherein the memory further stores user identification information, and the trusted information comprises a third hash value corresponding to the user identification information, and the microcode executing unit further calculates a fourth hash value for the user identification information, and authenticates a digital signature of the digital certificate according to the user identification information when the fourth hash value is equal to the third hash value.

3. The computer system as claimed in claim 1, wherein the microcode executing unit further obtains a third hash value corresponding to the trusted module from an extension field of the digital certificate to perform the authentication of the trusted module, when the digital certificate is successfully authenticated.

4. The computer system as claimed in claim 3, wherein the microcode executing unit further calculates a fourth hash value for the trusted module, determines whether the trusted module conforms to a hardware platform specification of the computer system when the fourth hash value is equal to the third hash value, and determines that the digital certificate is successfully authenticated when the trusted module conforms to the hardware platform specification.

5. The computer system as claimed in claim 1, wherein the microcode executing unit further obtains a first version number corresponding to the trusted module from an extension field of the digital certificate when the digital certificate is successfully authenticated, and the trusted information comprises a second version number corresponding to the trusted module, and the microcode executing unit further determines whether the first version number is greater than or equal to the second version number, and the authentication of the trusted module is performed when the first version number is greater than or equal to the second version number.

6. The computer system as claimed in claim 1, wherein the memory further stores a certificate chain of the trusted module when a certificate chain length of the digital certificate is greater than one, and the digital certificate is a root Certificate Authority (CA) certificate of the certificate chain, and the microcode executing unit further performs the following when the digital certificate is successfully authenticated:
    authenticating an intermediate Certificate of the certificate chain according to the root Certificate; and
    authenticating a leaf Certificate of the certificate chain according to the intermediate Certificate,
    wherein the authentication of the trusted module is performed according to a third hash value corresponding to the trusted module, wherein the third hash value is stored in an extension field of the leaf Certificate.

7. The computer system as claimed in claim 1, wherein the trusted module is associated with the first of a plurality of trusted firmware units of a Basic Input or Output System (BIOS), and the microcode executing unit further authenticates the trusted firmware units one by one starting from the authentication of the trusted module when booting the computer system, thereby establishing a static chain of trust to verify authenticity of the BIOS, and allows execution of the BIOS to complete the booting of the computer system when the BIOS is successfully authenticated.

8. The computer system as claimed in claim 1, wherein, when the processor is configured to execute a trigger instruction, the microcode executing unit further authenticates a plurality of trusted functional blocks one by one with each of the plurality of trusted functional blocks being authenticated by a previous one, thereby establishing a dynamic chain of trust.

9. The computer system as claimed in claim 8, wherein each of the trusted functional blocks is associated with a respective functional block of a plurality of functional blocks of an operating system or software application, and the microcode executing unit further establishes a respective dynamic chain of trust for each of the functional blocks when the operating system or software application is being executed.

10. A method for trusted module execution, which is executed by a processor, comprising:
    retrieving from a memory a trusted module and a digital certificate of the trusted module;
    calculating a first hash value for a public key of the digital certificate;
    using China commercial cryptography algorithms to authenticate the digital certificate according to trusted information stored in an efuse of the processor, wherein the trusted information is pre-generated using the China commercial cryptography algorithms and comprises a second hash value corresponding to the public key of the digital certificate;
    wherein the authentication of the digital certificate is allowed to be performed when the calculated first hash value is equal to the second hash value;
    authenticating the trusted module according to the authenticated digital certificate; and
    allowing execution of a Basic Input or Output System (BIOS), an operating system, or a software application, associated with the trusted module, when the trusted module is successfully authenticated.

11. The method as claimed in claim 10, wherein the trusted information comprises a third hash value corresponding to user identification information, and the method further comprises retrieving the user identification information from the memory, calculating a fourth hash value for the user identification information, and authenticating a digital signature of the digital certificate according to the user identification information when the fourth hash value is equal to the third hash value.

12. The method as claimed in claim 10, further comprising:
    obtaining a third hash value corresponding to the trusted module from an extension field of the digital certificate to perform the authentication of the trusted module, when the digital certificate is successfully authenticated.

13. The method as claimed in claim 12, wherein the authentication of the trusted module further comprises:
    calculating a fourth hash value for the trusted module;
    determining whether the trusted module conforms to a hardware platform specification of the computer system when the fourth hash value is equal to the third hash value; and
    determining that the digital certificate is successfully authenticated when the trusted module conforms to the hardware platform specification.

14. The method as claimed in claim 10, further comprising:
    obtaining a first version number corresponding to the trusted module from an extension field of the digital certificate when the digital certificate is successfully authenticated, wherein the trusted information comprises a second version number corresponding to the trusted module; and
    determining whether the first version number is greater than or equal to the second version number, wherein the authentication of the trusted module is performed when the first version number is greater than or equal to the second version number.

15. The method as claimed in claim 10, further comprising:
    retrieving from the memory a certificate chain of the trusted module when a certificate chain length of the digital certificate is greater than one, wherein the digital certificate is a root Certificate Authority (CA) certificate of the certificate chain; and
    when the digital certificate is successfully authenticated, authenticating an intermediate Certificate of the certificate chain according to the root Certificate; and
    authenticating a leaf Certificate of the certificate chain according to the intermediate Certificate,
    wherein the authentication of the trusted module is performed according to a third hash value corresponding to the trusted module, wherein the third hash value is stored in an extension field of the leaf Certificate.

16. The method as claimed in claim 10, wherein the trusted module is associated with the first of a plurality of trusted firmware units of the BIOS, and the method further comprises:
    authenticating the trusted firmware units one by one starting from the authentication of the trusted module when booting a computer system on which the BIOS is launched, thereby establishing a static chain of trust to verify authenticity of the BIOS.

17. The method as claimed in claim 10, wherein the trusted module is associated with the first of a plurality of trusted functional blocks of the operating system or software application, and the method further comprises:
   authenticating the trusted functional blocks one by one with each of the trusted functional blocks being authenticated by a previous one when a trigger instruction is executed, thereby establishing a dynamic chain of trust to verify authenticity of the operating system or software application.

18. The method as claimed in claim 17, wherein each of the trusted functional blocks is associated with a respective functional block of the operating system or software application, and the method further comprises:
   establishing a respective dynamic chain of trust for each of the functional blocks when the operating system or software application is being executed.

* * * * *